United States Patent
Kaesser et al.

(10) Patent No.: US 10,288,025 B2
(45) Date of Patent: *May 14, 2019

(54) PISTON FUEL PUMP FOR AN INTERNAL COMBUSTION ENGINE

(71) Applicant: Robert Bosch GmbH, Stuttgart (DE)

(72) Inventors: Jochen Kaesser, Schorndorf (DE); Bernd Beiermeister, Steinheim-Kleinbottwar (DE); Soeren Stritzel, Rayong (TH); Wolfgang Ochs, Grossbottwar (DE); Ralf Assmann, Schwabach (DE); Heiko Jahn, Tamm (DE); Christian Preissner, Schweinfurt (DE); Achim Laub, Waiblingen (DE); Peter Ropertz, Oberriexingen (DE); Stefen Zaensch, Stein (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

This patent is subject to a terminal disclaimer.

(21) Appl. No.: 15/535,331

(22) PCT Filed: Dec. 4, 2015

(86) PCT No.: PCT/EP2015/078702
§ 371 (c)(1),
(2) Date: Jun. 12, 2017

(87) PCT Pub. No.: WO2016/096485
PCT Pub. Date: Jun. 23, 2016

(65) Prior Publication Data
US 2018/0180006 A1 Jun. 28, 2018

(30) Foreign Application Priority Data
Dec. 17, 2014 (DE) .................. 10 2014 226 316

(51) Int. Cl.
 F02B 75/32 (2006.01)
 F02M 59/44 (2006.01)
 (Continued)

(52) U.S. Cl.
 CPC ........ *F02M 59/442* (2013.01); *F02M 59/445* (2013.01); *F04B 1/0408* (2013.01);
 (Continued)

(58) Field of Classification Search
 CPC .... F04B 39/04; F04B 39/0276; F04B 39/041; F04B 39/042; F04B 39/045; F04B 53/02;
 (Continued)

(56) References Cited

U.S. PATENT DOCUMENTS 4,245,654 A * 1/1981 Raitto ................ A61B 5/15003
  600/578
5,617,308 A 4/1997 Weise et al.
 (Continued)

FOREIGN PATENT DOCUMENTS

CN 101495749 A 7/2009
CN 102138002 A 7/2011
 (Continued)

OTHER PUBLICATIONS

International Search Report corresponding to PCT Application No. PCT/EP2015/078702, dated Feb. 18, 2016 (German and English language document) (11 pages).

*Primary Examiner* — John Kwon
(74) *Attorney, Agent, or Firm* — Maginot, Moore & Beck LLP

(57) ABSTRACT

A piston fuel pump for an internal combustion engine includes a pump cylinder, a pump piston, and a seal. The pump piston is configured to be moved axially in the pump cylinder, wherein a working chamber is delimited by the pump piston. The seal is disposed on the pump piston and (Continued)

seals off the working chamber from a low-pressure region. The seal seals off an end section of the pump piston adjacent to the working chamber from the working chamber.

20 Claims, 5 Drawing Sheets

(51) Int. Cl.
*F04B 53/14* (2006.01)
*F04B 1/04* (2006.01)
*F16J 1/00* (2006.01)
*F16J 15/3276* (2016.01)

(52) U.S. Cl.
CPC .......... *F04B 1/0448* (2013.01); *F04B 53/143* (2013.01); *F16J 1/008* (2013.01); *F16J 15/3276* (2013.01); *F02M 2200/8046* (2013.01); *F02M 2200/8061* (2013.01); *F02M 2200/9015* (2013.01)

(58) Field of Classification Search
CPC ........ F04B 53/008; F04B 53/14; F04B 53/16; F04B 53/143; F04B 15/02; F04B 19/22; F04B 17/05; F02M 59/06; F02M 59/025; F02M 59/027; F02M 59/02; F02M 59/442; F16J 3/06; F16J 15/16
USPC ............................................ 123/193.1, 193.6
See application file for complete search history.

(56) References Cited

U.S. PATENT DOCUMENTS

| | | |
|---|---|---|
| 7,085,144 B2 | 8/2006 | Taguchi et al. |
| 2002/0176788 A1 | 11/2002 | Moutafis et al. |
| 2007/0091652 A1 | 4/2007 | Hirota et al. |
| 2008/0098886 A1 | 5/2008 | Lindsten et al. |
| 2008/0224417 A1 | 9/2008 | Benson et al. |
| 2010/0226159 A1 | 9/2010 | Stern |
| 2012/0247323 A1* | 10/2012 | Obrist ..................... B05B 11/02 92/175 |
| 2014/0207075 A1* | 7/2014 | Yotsutsuji ........... A61M 5/3129 604/192 |
| 2015/0308394 A1* | 10/2015 | Flo ........................ F02M 59/02 417/437 |
| 2017/0009721 A1* | 1/2017 | Albrecht .............. F02M 55/007 |
| 2017/0009722 A1* | 1/2017 | Stritzel ................. F02M 59/06 |
| 2017/0009767 A1* | 1/2017 | Stritzel .................... F16J 1/008 |
| 2018/0180006 A1* | 6/2018 | Kaesser ................... F16J 1/008 |

FOREIGN PATENT DOCUMENTS

| | | |
|---|---|---|
| CN | 102483163 A | 5/2012 |
| DE | 196 18 013 A1 | 11/1997 |
| DE | 103 27 408 A1 | 4/2004 |
| DE | 10 2004 013 307 A1 | 9/2005 |
| DE | 10 2008 010 242 A1 | 8/2009 |
| DE | 10 2008 043 846 A1 | 5/2010 |
| DE | 10 2012 204 302 A1 | 9/2013 |
| DE | 10 2013 226 062 A1 | 6/2014 |
| EP | 1 384 003 B1 | 7/2007 |
| EP | 2 690 261 A2 | 1/2014 |
| JP | 2-54970 U | 4/1990 |
| JP | H 11-22630 A | 1/1999 |
| JP | H 11-248003 A | 9/1999 |
| JP | 2000-515230 A | 11/2000 |
| JP | 2002-018912 A | 1/2002 |
| JP | 2017-532630 A | 11/2017 |
| WO | 98/04853 A1 | 2/1998 |
| WO | 2007/137951 A1 | 12/2007 |
| WO | 2014/095120 A1 | 6/2014 |
| WO | 2014/095781 A1 | 6/2014 |
| WO | 2015/120945 A1 | 8/2015 |

* cited by examiner

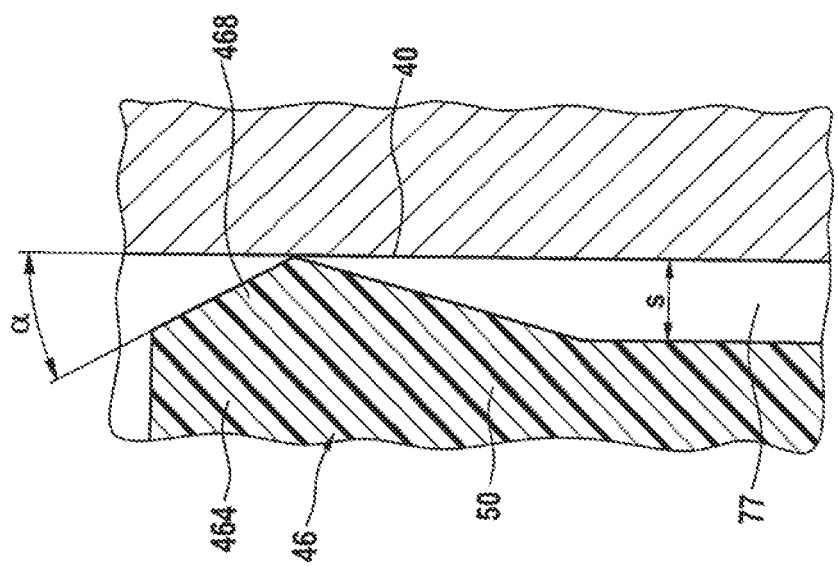
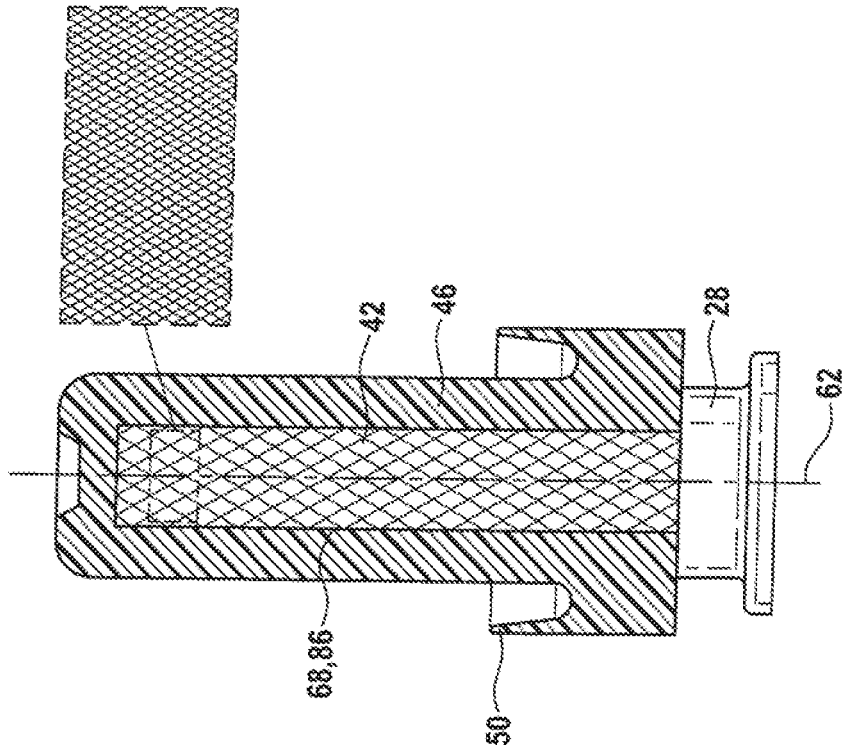

PISTON FUEL PUMP FOR AN INTERNAL COMBUSTION ENGINE

This application is a 35 U.S.C. § 371 National Stage Application of PCT/EP2015/078702, filed on Dec. 4, 2015, which claims the benefit of priority to Serial No. DE 10 2014 226 316.6, filed on Dec. 17, 2014 in Germany, the disclosures of which are incorporated herein by reference in their entirety.

BACKGROUND

The disclosure relates to a piston fuel pump.

The piston fuel pump known from WO 2014095120 A1, for example, comprises a pump cylinder and a pump piston, which is accommodated movably in the pump cylinder. This piston fuel pump has a bearing and sealing arrangement for the pump piston, which comprises a guiding region for the axial guidance of the pump piston in the pump cylinder and a sealing region, which has a sealing lip.

SUMMARY

According to the disclosure, it is envisaged that, in a piston fuel pump for an internal combustion engine having a pump cylinder and a pump piston, which can be moved axially in the pump cylinder, and having a working chamber delimited by the pump piston, wherein there is on the pump piston a seal that seals the working chamber off from a low-pressure region, the seal also seals off the end section of the pump piston adjacent to the working chamber from the working chamber, in particular seals it off completely.

In particular, the seal seals off a gap present between the pump piston and the pump cylinder.

By virtue of the fact that the seal seals off the end section of the pump piston adjacent to the working chamber from the working chamber, the entire pump piston is situated on the side of the seal away from the working chamber, that is to say, in particular, in a low-pressure region. In this way, leakage between the working chamber and the low-pressure region, which can occur along a path extending between the pump piston and the seal in the pump known from the prior art, is completely and reliably excluded.

In the present case, the term "end section of the pump piston adjacent to the working chamber" is taken to mean, in particular, a region which comprises the end of the pump piston adjacent to the working chamber and furthermore an end section of the pump piston pointing toward the working chamber in an axial direction.

In the case of a pump piston which is designed as a stepped piston which narrows toward the working chamber, in particular one with cylindrical subsections, the end section adjacent to the working chamber can be, in particular, the narrowed part of the stepped piston and/or that region of the pump piston which is situated on the working-chamber side of the step.

Relative to the longitudinal extent of the pump piston, i.e. in an axial direction, it is possible for the end section of the pump piston adjacent to the working chamber to be formed only in the half of the pump piston adjacent to the working chamber, for example, or even only in the outer quarter of the pump piston adjacent to the working chamber in an axial direction.

Sealing off the end section of the pump piston adjacent to the working chamber from the working chamber by means of the seal can be achieved if the seal has a recess, in particular a recess having a cylindrical basic shape, in which the end section of the pump piston adjacent to the working chamber is arranged and/or which is filled, in particular completely filled, by the end section of the pump piston adjacent to the working chamber. In other words, the seal thus covers the end section of the pump piston adjacent to the working chamber, in particular, both radially and at the end of the pump piston facing the working chamber. To express this in yet another way, the seal thus has, in particular, a cup-shaped inner contour, in which the end section of the pump piston adjacent to the working chamber is arranged and/or which is filled, in particular completely filled, by the end section of the pump piston adjacent to the working chamber.

Here, the term "cup-shaped" implies, in particular, the presence of a front end surface, which can be designed as a round surface, for example, and of an integrally formed circumferential wall at the edge of the end surface, which, in particular, can be extended perpendicularly to the end surface.

Although the term "cylindrical basic shape" also includes, in particular, shapes which are in fact geometrically exact cylindrical shapes, it should fundamentally be interpreted broadly, in particular in the sense of "elongate", and does not represent a restriction in terms of surface structures which can be formed on the pump piston and on the seal and which will be discussed in greater detail below.

Developments of the disclosure envisage that the seal is applied directly to the pump piston by means of an injection molding method. Here, the term "direct application" is taken to mean, in particular, that the material of the seal is applied to the piston in a liquid state and then solidifies on said piston, in particular sets as a consequence of cooling.

On the one hand, direct application of the seal to the pump piston by means of an injection molding method has the advantage that separate production of the seal and subsequent handling and connection to the pump piston are eliminated and therefore manufacture is simplified. Moreover, many different geometrical configurations of the interface between the seal and the pump piston, in particular positive connections, can easily be achieved in this way.

Developments of the disclosure envisage that the end section of the pump piston adjacent to the working chamber and the seal are in positive engagement with one another. Here, the terms "positive engagement" and "positive connection" are used in the sense of VDI 2232; in particular, the end section of the pump piston adjacent to the working chamber and the seal are in positive engagement with one another when they are interlocked by virtue of their shape.

In addition or as an alternative, the end section of the pump piston adjacent to the working chamber and the seal can be connected nonpositively to one another, it being possible, in particular, for the seal to rest under stress on the end section of the pump piston adjacent to the working chamber.

Particularly to achieve positive engagement, provision is made, in particular, for the end section of the pump piston adjacent to the working chamber to have a first surface structure and the seal to have a second surface structure, and for the first surface structure and the second surface structure to be complementary to one another and/or to engage in one another. In this case, the first surface structure and the second surface structure can fill each other, in particular can fill each other completely.

Here, a surface structure of the seal or of the pump piston is taken to mean, in particular, geometrical features which do not affect the geometrical basic shape of the seal or of the pump piston which has already been discussed above. For example, surface structures can merely have features, the structure sizes of which are significantly smaller, e.g. no more than 10%, than structure sizes of the seal and/or of the end section of the pump piston adjacent to the working chamber, e.g. the total length, and/or the largest diameter of the seal and/or of the pump piston and/or of the end section of the pump piston adjacent to the working chamber.

The surface structure of the seal or of the piston can be geometrically regular, being, for example, a groove structure and/or a wave structure, in particular with grooves and/or waves which run radially around the end section of the pump piston adjacent to the working chamber. Another example of a geometrically regular surface structure is a knurled structure, in particular a cross-cut knurled structure, which can be applied in a simple manner to a pump piston. In particular, the term "knurled structure" is interpreted in light of DIN 82 of 1973. Structure sizes of geometrically regular surface structures in an axial and/or tangential direction are specified, in particular, by the periodicity thereof. Structure sizes of geometrically regular surface structures in a radial direction are specified, in particular, by the amplitude thereof.

On the other hand, the surface structure of the seal and/or of the pump piston can also be geometrically irregular, being implemented, for example, by a roughness of the pump piston and/or of the seal, in particular a relatively great roughness thereof. In this case, structure sizes in an axial and/or tangential and/or radial direction can nevertheless likewise be specified on the basis of the sizes known from the characterization of surface roughness. For example, Pt and/or Rz and/or Ra can be interpreted as structure depth. For example, the wavelength at which the maximum of a spectral decomposition of the surface roughness of the seal and/or of the pump piston occurs, said decomposition being obtained, in particular, by Fourier transformation, can be interpreted as the structure size in an axial and/or tangential direction.

In particular, surface structures with structure sizes in a radial direction in a range of from 0.1 mm to 2 mm are advantageously possible in principle. Here, deep structures, e.g. those with structure sizes in a radial direction of 0.5 mm or more, have the advantage of particularly effective interlocking between the end section of the pump piston adjacent to the working chamber and the seal. In contrast, shallow structures, e.g. those with structure sizes in a radial direction of 0.5 mm or less, have the advantage that they can be produced in a particularly simple manner.

It is particularly advantageous if the structure size in a radial direction, i.e. the structure depth, is sufficiently large in comparison with the structure size in an axial and/or tangential direction since this ensures the effect of interlocking.

This is the case especially if the end section of the pump piston adjacent to the working chamber has a first surface structure and the seal has a second surface structure, and the first surface structure and/or the second surface structure has/have a structure depth, measured in a radial direction, and a structure size, measured in a tangential and/or axial direction, and the structure size, measured in a tangential and/or axial direction, is no more than 10 times the structure depth, preferably even no more than 5 times the structure depth.

In particular, the seal can comprise a thermoplastic material or can consist of a thermoplastic material. In particular, the thermoplastic material can be a thermoplastic polymer, e.g. a fiber-reinforced thermoplastic polymer. This can be polyetheretherketone (PEEK) reinforced with carbon fibers, for example. One such is PEEK 150CA30, for example. Another preferred thermoplastic material is PA66CF20.

The seal has a thickness in a range of from 0.5 mm to 1.8 mm in order to ensure high strength, a low mass and simplicity of manufacture in equal measure.

In particular, the fuel piston pump is a pump which has a pump housing, in which a working chamber delimited by the pump piston is formed. The compression of the fuel takes place, in particular, in said working chamber, in particular through an axial movement of the pump piston, which reduces the size of the working chamber. In particular, compression of the fuel in the working chamber takes place at a high pressure level, e.g. at 100 bar to 600 bar.

In particular, the seal according to the disclosure is formed between the working chamber and a low-pressure region of the pump. The pressure in the low-pressure region is lower than the high pressure level generated in the working chamber of the pump. The pressure level in the low-pressure region can be 3 bar to 10 bar, for example, and can be generated by a separate feed pump.

The working chamber is connected to a pump outlet, in particular via an outlet valve, and is connected to a pump inlet, in particular via an electrically controllable inlet valve. In particular, the electrically controllable inlet valve can be designed as a quantity control valve. As an option, a damping device for damping pulsations in the low-pressure region of the pump can furthermore be provided in addition between the pump inlet and the working chamber.

The damping device for damping pulsations in the low-pressure region can comprise a gas volume enclosed between two diaphragms, for example, and details of the damping device can be embodied as shown in DE10327408A1.

Another valve, which is arranged between the pump outlet and the working chamber and is arranged antiparallel to the outlet valve, can be provided and, in particular, can act as a pressure limiting valve for a high-pressure accumulator that can be connected to the pump.

The outlet valve and/or the inlet valve and/or the pressure limiting valve are preferably fixed so as to be stationary relative to the pump housing and thus also stationary with respect to the pump cylinder. Thus, there is, in particular, no fixing of these components on the pump piston. The resulting advantage is that the mass of the pump piston is low and thus the dynamics or ease of movement of the pump is/are improved.

In addition or as an alternative, the pump piston is preferably designed as a solid body, thus allowing it to withstand, without deformation, the high pressures which act during fuel injection, especially in the case of direct gasoline injection. To this extent, there is no possibility of flow through the pump piston in the longitudinal direction.

Further details of the arrangement of the working chamber, the outlet valve and the pressure limiting valve relative to one another and in the pump body can be embodied as shown in DE102004013307A1, for example.

The pump cylinder can be formed in a bushing fixed in the pump body. As an alternative, the pump cylinder can also be provided directly in the pump body.

The pump body, the pump piston, the pump cylinder and/or all the pump components which come into contact with the fuel preferably consist exclusively of steels and plastics, with the result that there is a high resistance even to fuels that contain ethanol and/or to other aggressive fuels.

Other developments of the disclosure are based on the object of maximizing the life of the piston fuel pump. It has furthermore been recognized that wear occurring in the region of the seal is caused significantly by the friction which occurs between the seal and the pump cylinder.

The friction phenomena which occur here can be divided into classes or phases in accordance with DIN 50281, depending on the type of occurring contact states between the friction partners, in this case the seal and the pump cylinder.

In the case of "solid body friction", for example, there is direct contact between the friction partners. The occurring friction forces and the resulting wear are correspondingly high.

In the case of liquid friction, in contrast, there is no longer direct contact between the friction partners. The friction partners are separated from one another by a liquid medium, e.g. by a continuous liquid film, in the present case by a continuous fuel film, for example. Here, the occurring friction forces are generally considerably lower than with solid body friction. Accordingly, the wear which occurs on the friction partners is also correspondingly reduced.

Moreover, mixed friction can also occur, exhibiting components of solid body friction and components of liquid friction in temporal and/or spatial succession.

In general, it can be assumed that the seal comes to rest on the pump cylinder when it is at rest relative to the pump cylinder, e.g. at the reversal points of the pump piston. At the beginning of a relative movement between the pump piston and the pump cylinder, the occurrence of solid body friction, at least briefly, between the seal and the pump cylinder is therefore virtually unavoidable.

These developments are furthermore based on the recognition that the phases in which solid body friction occurs between the seal and the pump cylinder should be minimized.

In particular, this is achieved by virtue of the fact that a radially outer surface of the seal, which is situated opposite an inner surface of the pump cylinder, is designed in such a way in an axial end region of the seal that it rests on the pump cylinder when the pump piston is at rest relative to the pump cylinder and that a relative movement between the pump cylinder and the pump piston in an axial direction promotes liftoff of the seal from the pump piston in a radially inward direction.

This can be achieved, in particular, by the measure that a radially outer surface of the seal, which is situated opposite an inner surface of the pump cylinder, slopes radially inward at an angle $\alpha$ of 10° to 60° to the inner wall of the pump cylinder in an axial end region of the seal. During this process, the fuel to be compressed by the pump piston exerts, in particular, a radially inward-acting force on the radially outer surface of the seal, thus allowing the latter to lift off, in particular to lift off somewhat, from the pump cylinder and, in particular, allowing the formation of a fuel film between the seal and the pump cylinder.

Further subject matter is given by a piston fuel pump for an internal combustion engine having a pump cylinder and a pump piston, which can be moved axially in the pump cylinder, and having a working chamber delimited by the pump piston, wherein there is on the pump piston a seal that seals off the working chamber from a low-pressure region, characterized in that the seal is applied directly to the pump piston by means of an injection molding method. This subject matter can be developed and/or embodied by means of the characterizing feature of the disclosure and/or by means of the additional features of the descriptions, drawings, claims, and of the illustrative embodiments.

BRIEF DESCRIPTION OF THE DRAWINGS

Examples of the present disclosure are explained in greater detail below with reference to the attached drawings.

In the drawings:

FIGS. 3a-3f show alternative embodiments of the piston fuel pump

A sealing lip of the seal is shown on an enlarged scale in FIG. 4.

DETAILED DESCRIPTION

Figure 1:
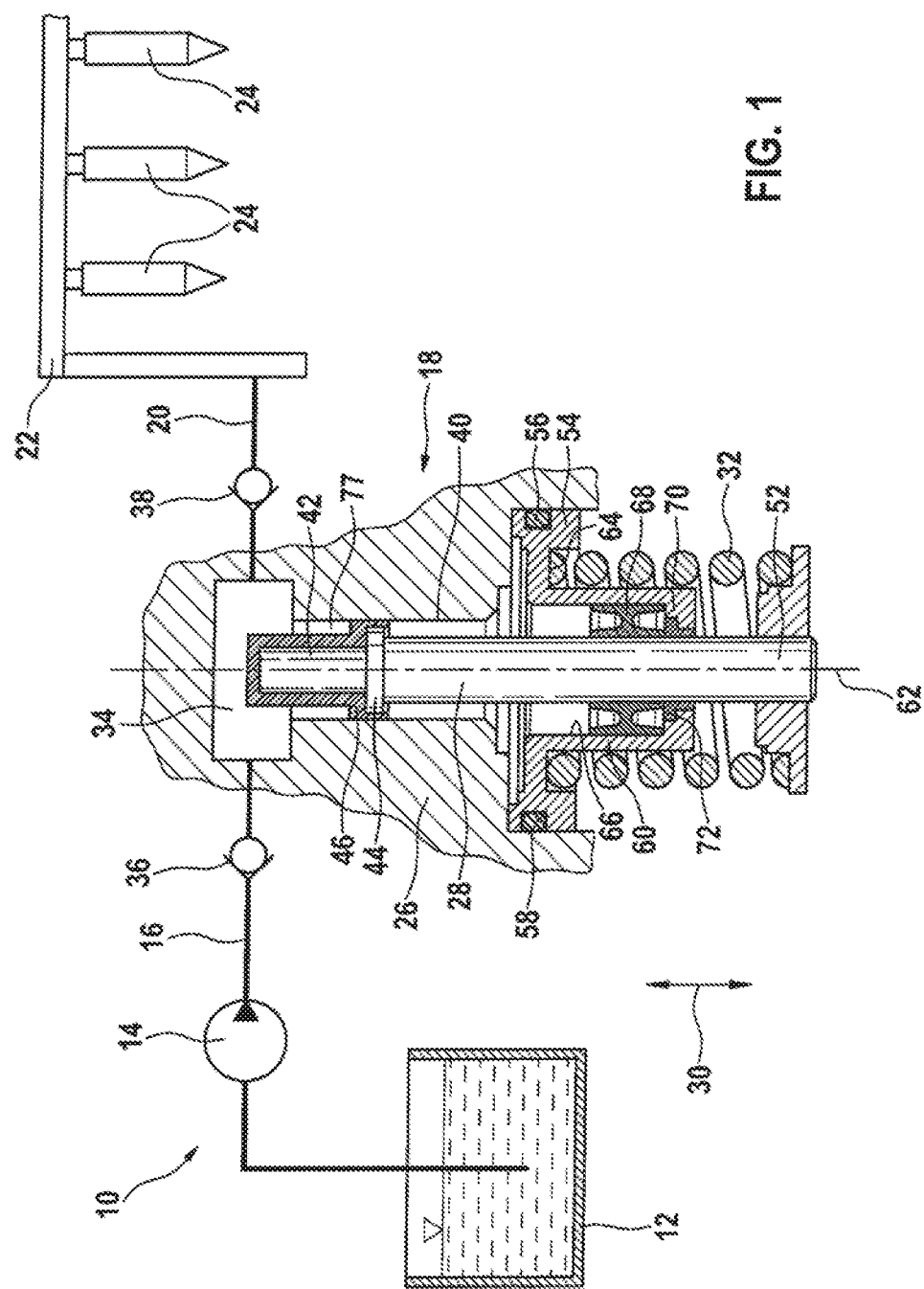
FIG. 1 shows a schematic illustration of a fuel system of an internal combustion engine with a detail of a piston fuel pump according to the disclosure

In FIG. 1, a fuel system of an internal combustion engine bears the reference sign 10 overall. It comprises a fuel tank 12, from which an electric feed pump 14 delivers the fuel into a low-pressure line 16. This leads to a high-pressure pump in the form of a piston fuel pump 18. From the latter, a high-pressure line 20 leads to a fuel rail 22. Connected to the latter is a plurality of injectors 24, which inject the fuel directly into combustion chambers (not shown) respectively associated therewith.

The piston fuel pump 18 comprises a pump housing 26, indicated only in part, in which a pump piston 28 is movably guided and supported. A reciprocating motion can be imparted to this pump piston by a cam drive (not shown), this being indicated by a double arrow 30 shown at the side. The pump piston 28 is urged by a helical spring 32 toward an end position, which is at the bottom in FIG. 1. The pump piston 28 and the pump housing 26 delimit a working chamber 34. This working chamber 34 can be connected to the low-pressure line 16 by means of an inlet valve 36. The working chamber 34 can furthermore be connected to the high-pressure line 20 by means of an outlet valve 38.

Both the inlet valve 36 and the outlet valve 38 are embodied as check valves. Although not illustrated, it is possible here to embody the inlet valve 36 as a quantity control valve. In the case of such a valve, the inlet valve 36 can be forcibly opened during a delivery stroke of the pump piston 28, thus ensuring that the fuel is not pumped into the fuel rail 22 but is pumped back into the low-pressure line 16. It is thereby possible to set the fuel quantity pumped into the fuel rail 22 by the piston fuel pump 18.

The pump piston 28 is guided in a pump cylinder 40, which is thus part of the pump housing 26. At an end facing the working chamber 34, the pump piston 28 has an end section 42, which is arranged at the top in FIG. 1. In the vicinity of this end section 42 adjacent to the working chamber, the pump piston 28 furthermore has an annular offset 44 in the form of a radially projecting encircling collar. A seal 46 comes to rest on the pump piston 28 or on the offset 44 and encloses the end section 42 of the pump piston 28 adjacent to the working chamber axially and radially. The end section 42 of the pump piston 28 adjacent to the working chamber is thereby sealed off completely from the working chamber 34, a medium in the working chamber thus does not come into contact with the end section 42 of the pump piston 28 adjacent to the working chamber and a hydraulic pressure acting in the working chamber thus no longer acts on the end section 42 of the pump piston 28 adjacent to the working chamber or acts on it only indirectly via the seal 46.

At its end remote from the working chamber 34, the pump piston 28 furthermore has an end section 52, which is at the bottom in FIG. 1. In the vicinity of this bottom end section 52, a guide sleeve 54 is arranged in a fixed manner on the pump housing 26. An O-ring seal 56 is arranged in a groove 58 between the guide sleeve 54 and the pump housing 26. The guide sleeve 54 has a cylindrical section 60, which extends coaxially with the pump piston 28 and through which the helical spring 32 is guided. Along a piston longitudinal axis 62, the helical spring 32 enters at least partially into a spring locating groove 64 of the guide sleeve 54, where it is supported axially against the guide sleeve 54.

In the interior, the guide sleeve 54 furthermore has a circular-cylindrical receiving section 66, which is formed essentially by the inner circumferential wall of the cylindrical section 60. An annular sealing element 68 is arranged in this receiving section 66 in a fixed location relative to the pump housing 26, wherein the sealing element 68 has an H-shaped cross section. A guide element 72 is furthermore likewise arranged in a fixed location relative to the pump housing 26 in a collar section 70 extending radially inward on the projecting end of the cylindrical section. Together with the seal 46, this guide element 72, which is thus spaced apart to a significant extent from the seal 46 when viewed in the axial direction of the pump piston 28, provides the guide or two-point support for the pump piston 28.

The embodiment of the seal 46 and the mounting thereof on the pump piston is of particular significance in the present case. These aspects will therefore be discussed in detail with reference to the following FIGS. 2-4.

Figure 2:
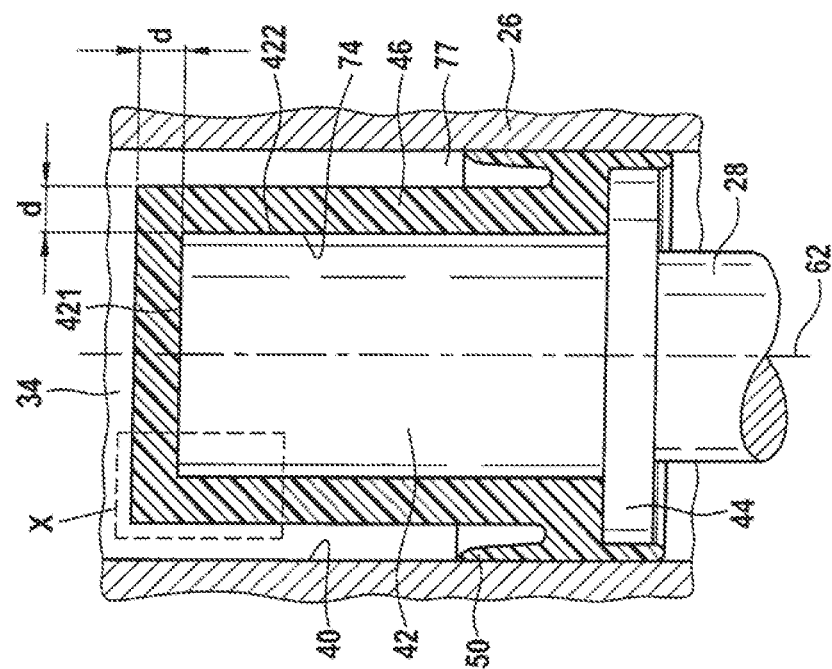
FIG. 2 shows an enlarged section through the detail of the piston fuel pump shown in FIG. 1

FIG. 2 shows a section through a detail of the piston fuel pump 18, wherein the end section 42 of the pump piston 28 adjacent to the working chamber and the seal 46 are shown on an enlarged scale.

The seal 46 has a recess 74 of cylindrical configuration, which is completely filled by the end section 42 of the pump piston 28 adjacent to the working chamber, with the result that, in interaction with the sealing function existing between the seal 46 and the pump cylinder 40, the end section 42 of the pump piston 28 adjacent to the working chamber is sealed off completely from the working chamber 34. At the same time, the seal 46 covers an end 421 of the end section 42 of the pump piston 28 adjacent to the working chamber and a lateral surface 422 of the end section 42 of the pump piston 28 adjacent to the working chamber, being molded directly onto said surface, and therefore the end section 42 of the pump piston 28 adjacent to the working chamber is completely covered by the seal 46.

A sealing lip 50, which interacts sealingly with the pump cylinder 40, is provided radially outside on the seal 46.

In this example, the seal 46 consists of the fiber-reinforced thermoplastic polymer PEEK 150CA30 or PA66CF20. The seal 46 is produced by an injection molding method, in which the liquefied thermoplastic polymer is applied directly to the end section 42 of the pump piston 28 adjacent to the working chamber in an axial molding direction along the piston longitudinal axis 62. For this purpose, use can be made, for example, of a hot-channel tool, in which the molten thermoplastic polymer is introduced at a relatively high temperature into a cavity formed between the end section 42 of the pump piston 28 adjacent to the working chamber and an injection mold. Following the cooling and solidification of the thermoplastic polymer, the pump piston 28 with the seal 46 fixed thereon can be removed from the injection mold. The seal 46 has a thickness d of one millimeter in order to ensure high strength, a low mass and simplicity of manufacture in equal measure.

Figure 3A:
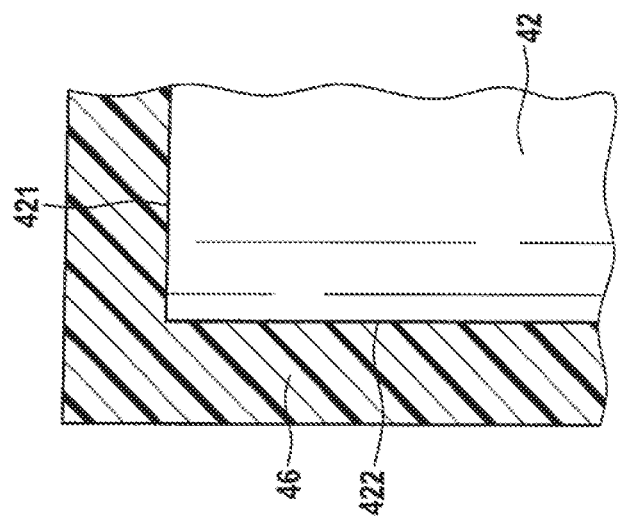

In this illustrative embodiment, the end section 42 of the pump piston 28 adjacent to the working chamber and the inner contour of the recess 74 in the seal 46, said inner contour being in contact with the pump piston, have a largely smooth surface. In FIG. 3a, which shows the detail X from FIG. 2, this is shown once again on an enlarged scale.

The following illustrative embodiments differ from the previous illustrative embodiments in having modified surface structures on the end section 42 of the pump piston 28 adjacent to the working chamber and on the inner contour of the seal 46.

Figure 3C:
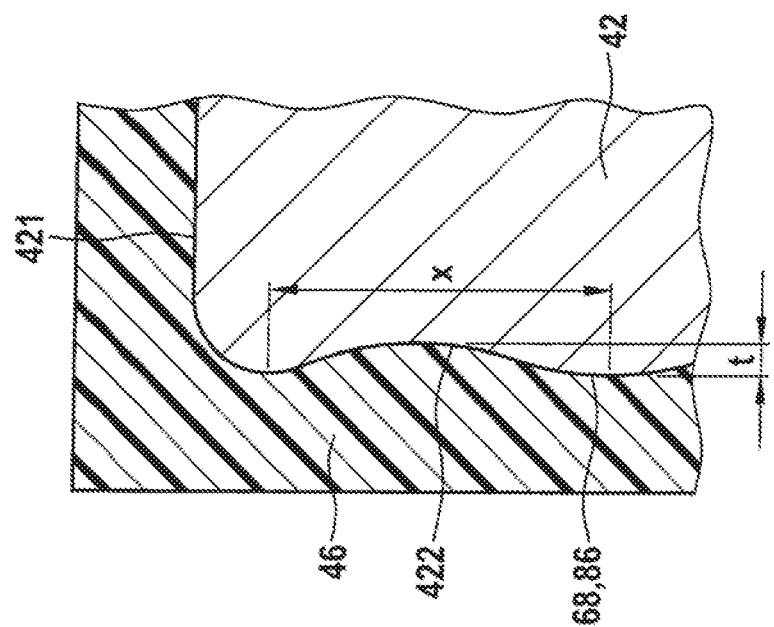
Figure 3B:
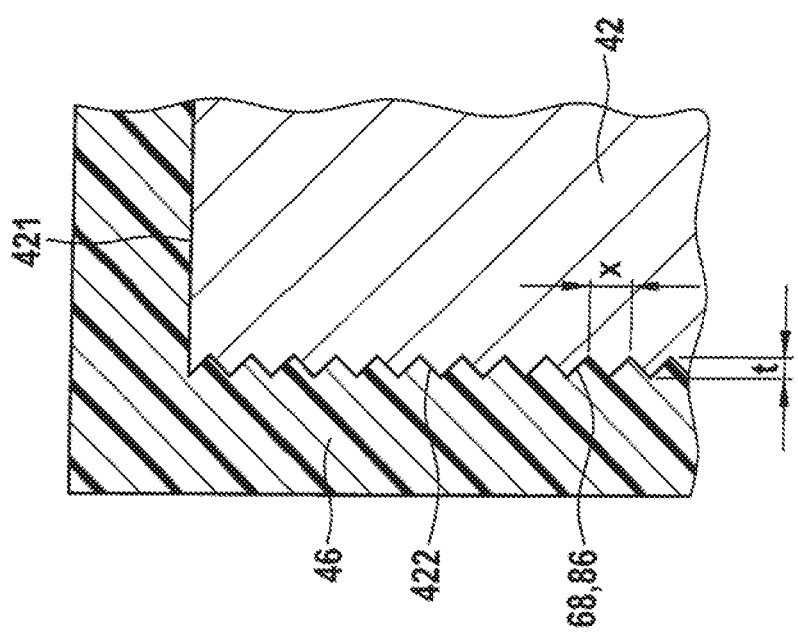

In FIG. 3b, the end section 42 of the pump piston 28 adjacent to the working chamber and the inner contour of the seal 46 have encircling grooves. The grooves have a depth t of 0.5 mm and a periodicity of 1 mm in the axial direction x. There can be a multiplicity of grooves, each of which runs around in a self-contained way. However, the encircling grooves can also form a single- or multi-turn thread overall. The groove structure formed on the surface of the end section 42 of the pump piston 28 adjacent to the working chamber is obviously designed to be complementary to the inner contour of the seal 46, i.e. as a negative, this being obtained easily by the injection molding process in the present case.

In another embodiment, which is particularly simple to produce, the grooves have a depth t of just 0.1 mm and a periodicity of 1 mm in the axial direction x.

In yet another embodiment, which ensures particularly good interlocking between the end section 42 of the pump piston 28 adjacent to the working chamber and the seal 46, the grooves have a depth t of 2 mm and a periodicity of 9 mm in the axial direction x. These grooves can also be designed as waves, see FIG. 3c.

Figure 3D:
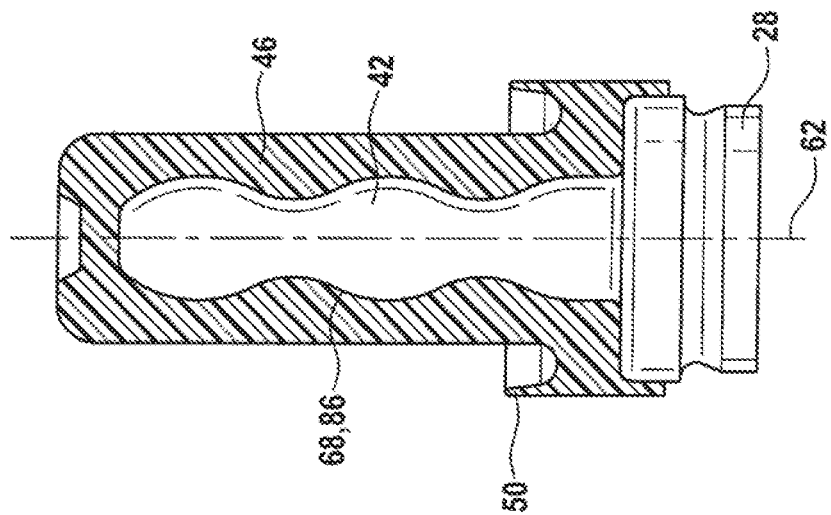
Figure 3E:
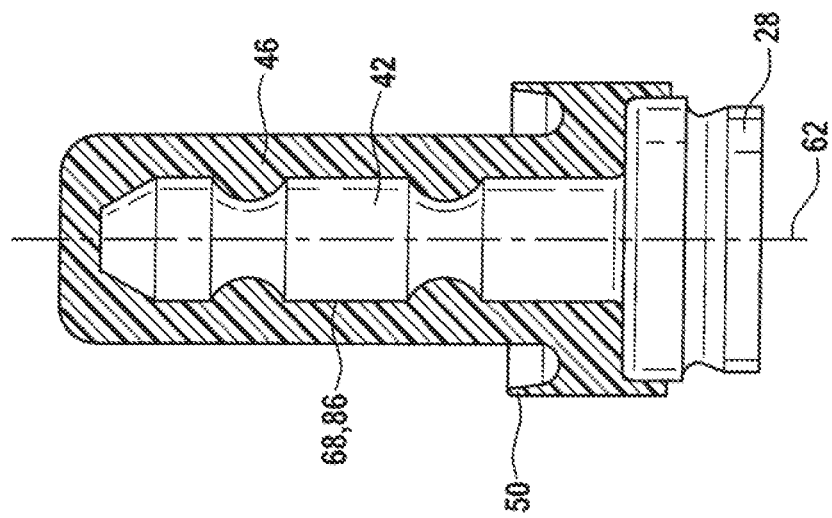

Examples of end sections 42 of the pump piston 28 adjacent to the working chamber which have relatively large grooves spaced further apart from one another are shown in FIGS. 3d and 3e.

As an alternative to groove structures, it is also possible to provide knurled structures or cross-cut knurled structures on the end section 42 of the pump piston 28 adjacent to the working chamber and on the inner contour of the seal 46. An example of such an end section 42 of the pump piston 28 adjacent to the working chamber is shown in FIG. 3f.

In addition to the regular surface structures shown above, it is of course also possible to provide irregular surface structures on the end section 42 of the pump piston 28 adjacent to the working chamber and on the inner contour of the seal 46, said structures representing in particular a roughness of the pump piston 28 and of the seal 46. In one example, the Pt value of a measurement of the surface of the pump piston is 0.2 mm and the wavelength at which the maximum of a spectral decomposition of the surface roughness (Ra spectrum) occurs is 1 mm.

With reference to FIG. 4, the fine geometry of the sealing lip 50 of the seals illustrated in the preceding embodiments will now be explained.

In the present case, an axial end region 464 of the seal 46 is formed on the sealing lip 50 on the working-chamber side. Provision is made for a radially outer surface of the seal 46, which is situated opposite an inner surface of the pump cylinder 40, to slope radially inward at an angle α of 10° to 60° to the inner wall of the pump cylinder 40 in an axial end region 464 of the seal 46. This has the effect or, alternatively, it is envisaged that a relative movement between the pump cylinder 40 and the pump piston 28 in an axial direction, in particular in the direction of the working chamber 34, promotes liftoff of the seal 46 from the pump cylinder 28 in a radially inward direction. In this case, a liquid film consisting of fuel forms between the seal 46 and the pump cylinder 40 and, with slight leakage, considerably reduces the wear on the piston fuel pump 18.

For this purpose, an outward-pointing encircling ridge 468 is formed integrally at or on the sealing lip 50, said ridge having, in a longitudinal direction and in cross section, approximately the shape of an isosceles triangle, of which the two opposite acute angles point in axial directions and the third, obtuse angle rests (statically) on the pump cylinder 40. It is envisaged that only this ridge comes to rest (statically) on the pump cylinder 40, while the seal 46 or the sealing lip 50 is otherwise spaced apart from the pump cylinder 40 by a gap 77. A width s of the gap 77 is 20 μm, for example. As explained above, liftoff of the ridge 468 from the pump cylinder 40 is furthermore also envisaged during relative movement.

The invention claimed is:

1. A piston fuel pump for an internal combustion engine, comprising:
    a pump cylinder;
    a pump piston configured to be moved axially in the pump cylinder, wherein a working chamber is delimited by the pump piston; and
    a seal disposed on the pump piston and configured to seal off the working chamber from a low-pressure region, wherein the seal seals off an end section of the pump piston adjacent to the working chamber from the working chamber.

2. The piston fuel pump as claimed in claim 1, wherein the seal is applied directly to the pump piston via an injection molding method.

3. The piston fuel pump as claimed in claim 1, wherein:
    the seal includes a recess having an inner contour; and
    the end section of the pump piston adjacent to the working chamber is arranged in the recess.

4. The piston fuel pump as claimed in claim 1, wherein:
    the seal includes a recess having an inner contour; and
    the recess is filled by the end section of the pump piston adjacent to the working chamber.

5. The piston fuel pump as claimed in claim 1, wherein the end section of the pump piston adjacent to the working chamber and the seal are in positive engagement with each other.

6. The piston fuel pump as claimed in claim 1, wherein:
    the end section of the pump piston adjacent to the working chamber includes a first surface structure;
    the seal includes a second surface structure; and
    the first surface structure and the second surface structure are at least one of complementary to each other and engage in each other.

7. The piston fuel pump as claimed in claim 6, wherein the first surface structure and the second surface structure fill each other.

8. The piston fuel pump as claimed in claim 6, wherein:
    at least one of the first surface structure and the second surface structure includes a structure depth in a range from 0.1 mm to 2 mm; and
    the structure depth is measured in a radial direction.

9. The piston fuel pump as claimed in claim 6, wherein:
    a structure size is in a range from 0.4 mm to 8 mm; and
    the structure size is measured in at least one of a tangential direction and an axial direction.

10. The piston fuel pump as claimed in claim 6, wherein:
    at least one of the first surface structure and the second surface structure includes a structure depth and a structure size;
    the structure depth is measured in a radial direction;
    the structure size is measured in at least one of a tangential direction and an axial direction; and
    the structure size is no more than 10 times the structure depth.

11. The piston fuel pump as claimed in claim 6, wherein at least one of the first surface structure and the second surface structure is a knurled structure.

12. The piston fuel pump as claimed in claim 6, wherein the first surface structure is a groove or wave structure running radially around the end section of the pump piston.

13. The piston fuel pump as claimed in claim 1, wherein the seal is held nonpositively on the end section of the pump piston adjacent to the working chamber.

14. The piston fuel pump as claimed in claim 1, wherein the seal includes a thermoplastic material.

15. The piston fuel pump as claimed in claim 1, wherein the seal includes an annular basic structure and is molded directly onto the end section of the pump piston adjacent to the working chamber via injection molding in an axial molding direction.

16. The piston fuel pump as claimed in claim 1, wherein:
    the seal includes a radially outer surface situated opposite an inner surface of the pump cylinder, and an axial end region;
    the radially outer surface is configured to rest on the pump cylinder when the pump piston is at rest relative to the pump cylinder;
    a relative movement between the pump cylinder and the pump piston in an axial direction promotes liftoff of the seal from the pump piston in a radially inward direction; and
    the radially outer surface of the seal slopes radially inward to an inner wall of the pump cylinder in the axial end region at an angle in a range from 10° to 60°.

17. The piston fuel pump as claimed in claim 3, wherein the inner contour is a cup-shaped inner contour.

18. The piston fuel pump as claimed in claim 4, wherein the inner contour is a cup-shaped inner contour.

19. The piston fuel pump as claimed in claim 11, wherein the knurled structure is a cross-cut knurled structure.

20. The piston fuel pump as claimed in claim 14, wherein the thermoplastic material is a fiber-reinforced thermoplastic material.

* * * * *